United States Patent
Salonaho et al.

(10) Patent No.: US 6,173,187 B1
(45) Date of Patent: Jan. 9, 2001

(54) METHOD OF SETTING LOAD GOAL, AND RADIO SYSTEM

(75) Inventors: Oscar Salonaho, Helsinki; Hannu Häkkinen, Espoo, both of (FI)

(73) Assignee: Nokia Telecommunications Oy, Espoo (FI)

( * ) Notice: Under 35 U.S.C. 154(b), the term of this patent shall be extended for 0 days.

(21) Appl. No.: 09/117,274

(22) PCT Filed: Nov. 25, 1997

(86) PCT No.: PCT/FI97/00719

§ 371 Date: Oct. 8, 1998

§ 102(e) Date: Oct. 8, 1998

(87) PCT Pub. No.: WO98/24198

PCT Pub. Date: Jun. 4, 1998

(30) Foreign Application Priority Data

Nov. 26, 1996 (FI) .................................................. 964708

(51) Int. Cl.[7] .................................................. H04Q 7/00
(52) U.S. Cl. .................................................. 455/453; 455/424
(58) Field of Search .................................................. 455/423, 424, 455/425, 450, 452, 453, 422, 522, 67.1, 67.4

(56) References Cited

U.S. PATENT DOCUMENTS

| 4,670,899 | * | 6/1987 | Brody et al. ................. | 455/453 |
| 5,504,938 | * | 4/1996 | Redden ...................... | 455/453 |
| 5,574,984 |   | 11/1996 | Reed et al. .................. | 455/453 |

FOREIGN PATENT DOCUMENTS

| 0 652 650 | 5/1995 | (EP) . |
| WO 93/09626 | 5/1993 | (WO) . |
| WO 96/02097 | 1/1996 | (WO) . |
| WO 97/13334 | 4/1997 | (WO) . |

* cited by examiner

*Primary Examiner*—Thanh Cong Le
(74) *Attorney, Agent, or Firm*—Altera Law Group, LLC

(57) ABSTRACT

The invention relates to a method of setting a load goal in a radio system. In the method a total signal strength (41) and a load result (44) are first formed, the load result being formed as an interrelationship between signal-to-interference ratio, bandwidth and data transmission rate. Then the total signal strength (41) change is compared with the load result (44) change, and such a load result (22) is searched for, the higher load results (44) of which provide a load result change lower than a predetermined threshold value in relation to the total signal (41) change, and said load result (22) is selected as a load goal.

24 Claims, 3 Drawing Sheets

METHOD OF SETTING LOAD GOAL, AND RADIO SYSTEM

FIELD OF THE INVENTION

The invention relates to a method of setting a load goal in a radio system comprising at least one subscriber terminal and a base station, and in which method a total strength of signals and a load result are formed, the load result being formed as an interrelationship between signal-to-interference ratio, bandwidth and data transmission rate.

The invention further relates to a radio system comprising at least one base station and a subscriber terminal, the radio system being arranged to form a total strength of signals and a load result as an interrelationship between signal-to-interference ratio, bandwidth and data transmission rate.

BACKGROUND OF THE INVENTION

The invention is applicable to interference limited cellular radio systems and particularly to a CDMA system. In the CDMA technique the user's narrowband data signal is modulated by a spreading code, which is more wideband than the data signal, to a comparatively wide band. In the methods, bandwidths from 1 to 50 MHz have been used. The spreading code is conventionally formed from a long pseudo-random bit sequence. The bit rate of the spreading code is much higher than that of the data signal. In order to distinguish spreading code bits from data bits and symbols comprising bits and combinations of bits, the spreading code bits are called chips. Each user data symbol is multiplied by the spreading code chips. Then the narrowband data signal spreads to the frequency band used by the spreading code. Each user has his/her own spreading code. Several users transmit simultaneously on the same frequency band and the data signals are distinguished from one another in the receivers on the basis of a pseudo-random spreading code.

The capacity of interference limited multiple access systems such as the CDMA cellular radio system is determined by an interference power caused by users. In such a system the subscriber terminal usually establishes a connection with the base station to which the path loss is the smallest. The base station coverage does not in all situations correspond to the traffic need, but the load of some base stations increases to such an extent that the connections to the subscriber terminals can be disconnected either due to the increased interference or to the inadequacy of the transmission capacity.

It is assumed in prior art handover and power regulation algorithms that a connection is established with the base station to which the path loss is the smallest. Such a best connection principle is thus preferable, as the traffic load towards the base station is constant or when the signal-interference ratio of the most loaded base station meets the minimum requirement. But when the load of a base station increases to such an extent that the minimum requirements of the connection quality cannot be met, a way is needed to balance the load. A prior art radio system does not, however, allow dynamic load goal management balancing the load, but prior art systems easily lead to an unstable situation, in which disconnecting the connection to some subscriber terminals is the only possibility. Such heavy load situations, in which the connection quality declines below the minimum requirements, and which can thus be called overload situations, are not desired.

In the interference limited radio systems it is of primary importance to keep the load sufficiently low, because otherwise owing to fast power regulation the transmitters increase their power to the maximum. At worst this, in turn, could lead to the disconnecting of most radio system connections. Then again, it is appropriate to simultaneously handle as many connections as possible.

Publication WO 93/09626 shows a method to compensate for the overload. Here a power level is compared with a threshold level. If the received power exceeds the threshold level, the signal interference level of the system is reduced by decreasing the transmission power of the subscriber terminals to correspond to the threshold value. Alternatively the base station determines a pilot signal's signal-to-noise ratio which, in turn, is compared with the threshold value. If the signal-to-noise ratio is lower than the threshold value, the threshold value is reduced and the subscriber terminals are directed to decrease their transmission powers to correspond to a new signal-to-noise ratio. In the solution according to publication WO 93/09626 quality objectives are lowered, when the received total power at the base station increases too much. Here, a drawback is that the solution presupposes that thermal noise can be distinguished from other interference, which is not very easy to implement.

SUMMARY OF THE INVENTION

An object of the present invention is to implement a method which aims to maximize the capacity of a radio system without changing quality objectives and knowing thermal noise.

This is achieved with the method of the type set forth in the preamble characterized by comparing a total signal strength change with a load result change; searching for such a load result, the higher load results of which provide a load result change lower than a predetermined threshold value in relation to a total signal change, and selecting said load result as a load goal.

The radio system of the invention is, in turn, characterized in that, for uplink connections the radio system comprises means to compare a total signal strength change with a load result change; the radio system comprises the means to search for such a load result, the higher load results of which provide a load result change lower than a predetermined threshold value in relation to a total signal change and the radio system comprises threshold value means which are arranged to select said load result as a load goal.

Great advantages are achieved with the method of the invention. The solution of the invention adapts to the capacity changes caused by changes in circumstances without changing the quality objectives or by changing the quality objectives in a controlled manner. The solution of the invention does not either presuppose any knowledge of thermal noise.

BRIEF DESCRIPTION OF THE DRAWINGS

In the following the invention will be explained in greater detail with reference to examples of the accompanying drawings, in which.

DESCRIPTION OF THE PREFERRED EMBODIMENTS

Figure 1:
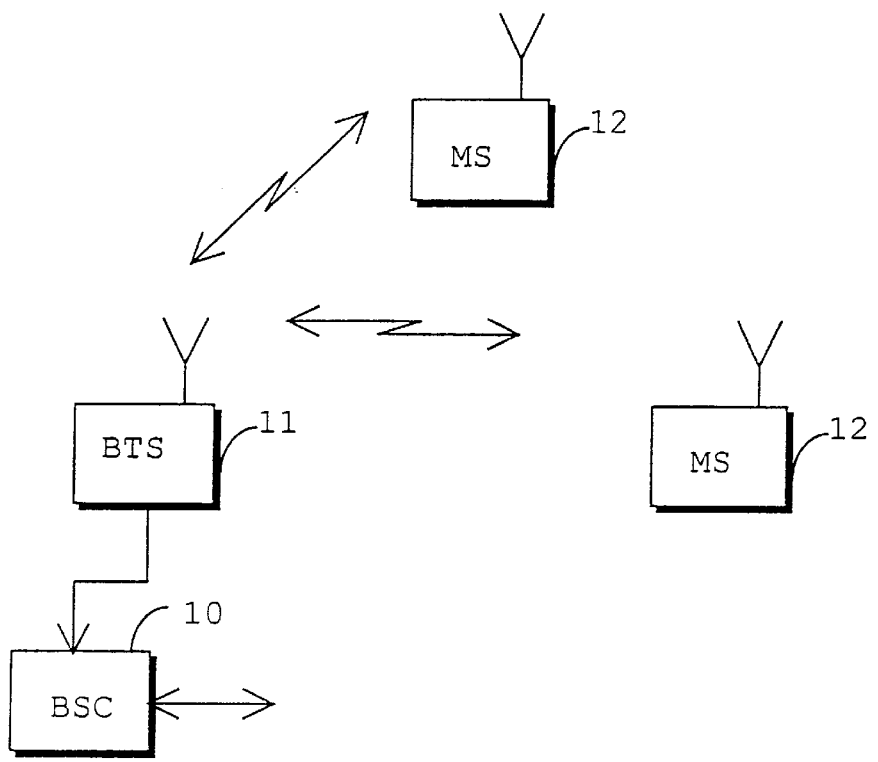
FIG. 1 shows a radio system.

The solution of the invention can be applied to a CDMA radio system without restricting thereto. The radio system in FIG. 1 comprises a base station controller 10, a base station 11, a subscriber terminal 12. The base station controller 10, having connections with other parts of the network, and the base station 11 communicate with one another using a digital link. The subscriber terminals 12, which are preferably mobile phones, are in bi-directional contact with the base station 11. The data transmission direction from the base station 11 to the subscriber terminal 12 is a downlink connection and the transmission direction from the subscriber terminal 12 to the base station 11 is an uplink connection. The load goals $L_d$ of the uplink and downlink connections are adjusted with the solution of the invention.

Figure 2:
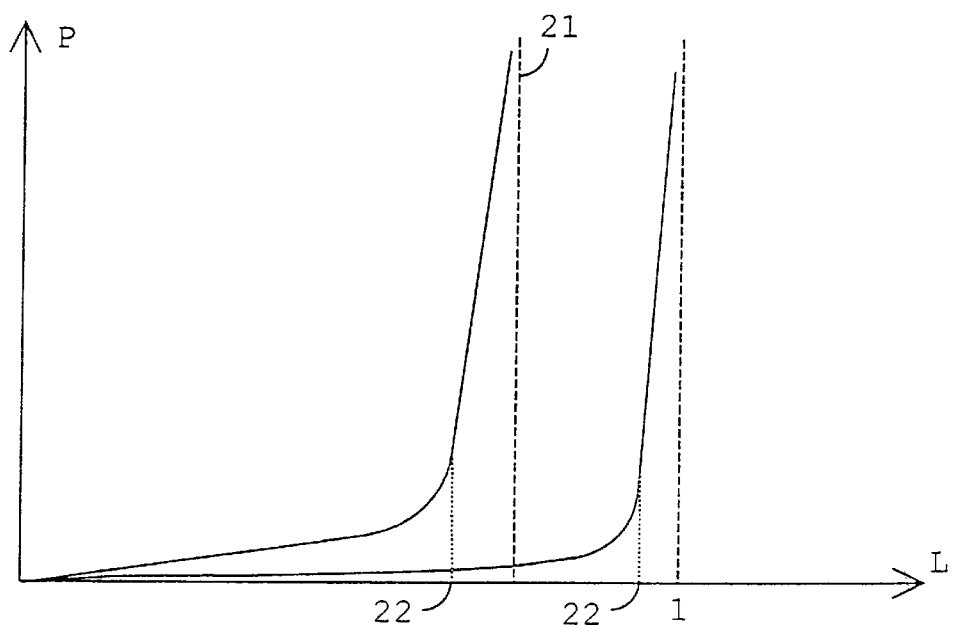
FIG. 2 shows a load.

FIG. 2 shows the powers of the signals arriving at the base station as the function of the load. The Figure shows that a load L reaches its maximum value when signal strengths P are extremely high. The signal strengths are preferably handled as powers. In the radio system a total interference interfering with a desired signal is formed out of other signals than precisely the desired signal (desired signals) and a constant interference caused by other electromagnetic radiation on said frequency band and, for example, the transceiver's thermal noise. The desired signal means a received signal which is to be detected. The load L can be detected by the following formula $$L = \sum_i \frac{P_{rx,i}}{P_{int,i}} = \frac{\sum_i P_{rx,i}}{\sum_i P_{rx,i} + I} + \sum_i \frac{SIR_{i,t}}{P_{gain}}, \quad (1)$$

where $P_{rx,i}$ is the strength of the received desired signals and I represents other interferences which are constant interferences $P_f$ caused by other cells, thermal noise $P_N$ and interferences caused by the desired signals, $a*\Sigma P_{rx,i}-SIR_{i,t}$ is a desired signal-to-interference ratio, $P_{gain}$ is defined $P_{gain,i}=$ $$P_{gain,i} = \frac{BW}{DS},$$

where BW is a bandwidth and DS is a data transmission rate. The desired signal-to-interference ratio $SIR_{i,t}$ is a predetermined connection-specific signal-to-interference ratio aimed at. The predetermined signal-to-interference ratio $SIR_{i,t}$ is utilized particularly when the load is determined in the transmission direction from the base station to the subscriber terminal. The desired signals of the first cell are thus also audible to the other cells and cause interference there, on account of which a higher transmission power is to be used in the other cells. The higher transmission power of the other cells, in turn, interfere with the desired signals of the first cell. Thus, the desired signals interfere with one another directly and indirectly by a weighting coefficient a. The formula can thus be written in a new form $$L = \frac{\sum_i P_{rx,i}}{(1+a)*\sum_i P_{rx,i} + P_N + P_f} -> \frac{1}{1+a} \quad (2)$$

where the weighting coefficient a is usually unknown. When the strengths of the desired signals increase, the maximum load approaches the threshold value 1/(1+a)21. As the limit of the maximum load varies according to situation, the base station load goals should also be updated in order not to end up in an overload situation. Then an advantageous load goal $L_d=1-\eta$ is b/(1+a)22, where b is lower than one, for example b=0.7. The load parameter $\eta$ is a positive real number between $\eta\epsilon[0, 1]$. In the method of the invention it is aimed to dynamically determine the load parameter $\eta$.

The desired load goal $L_d$ can be achieved with the inventive method in which the total powers of the signals are reviewed as a function of the load and regarding the load an instantaneous slope of the total power curve is calculated as a derivative. This preferably takes place by comparing the total strength change of the received signals with the load result change. As the desired load goal such a load result is set, the higher load results of which provide a load result change lower than the predetermined threshold value in relation to the total signal change. In other words, the curve in FIG. 2 rises as sharply as desired.

The slope is calculated, for example, from measurement result data in vector form. A load result $L_m$ based on measurings is formed repeatedly at intervals T, preferably in the range of 60 ms–200 ms, for example, 100 ms. At predetermined intervals T consecutive load results $L_m$ are stored as elements in a load factor vector $L_{mv}$, whose length can be set as desired. The total strengths $P_r$ of the received signals are also stored as elements in the total strength vector $P_{rv}$, whose length can also be set as desired, corresponding to the load factor vector $L_{mv}$. The vectors are preferably at least ten elements long. The received total strength change and the load result change are compared by comparing the mutual differences between the load result vector and the elements of the received total signal strength vector with the differences of the load result vector elements. The comparison is performed substantially according to the following formula:

$$\eta_{adj} = \frac{f(P_{rv}, L_{mv})}{g(L_{mv})}, \quad (3)$$

where f represents a deviation function between the total strength vector $P_{rv}$ of the signals and the load result vector $L_{mv}$ and g represents the internal deviation function of the load result vector $L_{mv}$. An adjustment parameter $\eta_{adj}$ of the load substantially represents the power curve slope of the signals as a function of the load. The substantial operation of the deviation function f and g is preferably standard deviation or variance or equivalent. Also a correlation-like formula can be used as the function f, the formula being, for example, as follows $$C[\tau] = \int_a^b P(t) \cdot L(t+\tau) dt, \quad (4)$$

where a and b represent points of time between which the correlation is calculated, P(t) is the signal power and the load L with delay $\tau$ which is preferably zero. The adjustment parameter $\tau_{adj}$ of the load is preferably formed according to the following formula:

$$\eta_{adj} = \frac{\text{cov}[\log(P_{rv}), \log(L_{mv})]}{\text{var}[\log(L_{mv})]}, \quad (5)$$

where cov stands for covariance, var stands for variance and log stands for logarithm function, particularly a ten-base logarithm function. Instead of variance a standard deviation can also be used, the standard deviation being obtained, for example, as a square root of variance. Variance is calculated from a variable $X=[x_1, x_2, \ldots, x_n]$, for example, as follows:

$$\text{std}^2 = \sigma_x^2 = \frac{1}{n-1} \sum_{j=1}^{n} (x_j - \hat{x})^2, \tag{6}$$

where $x_j$ is a sample j and $\hat{x}$ is a mean of all variables X. The standard deviation std is obtained as the square root of variance. Covariance cov from variables X and $Y=[y_1, y_2, \ldots, y_n]$ is, in turn, calculated, for example, according to the formula $$\text{cov} = \sigma_{xy}^2 = \frac{1}{n-1} \sum_{j=1}^{n} (x_j - \hat{x})(y_j - \hat{y}), \tag{7}$$

where $y_j$ is a sample j and $\hat{y}$ is a mean of all variables Y.

The load goal is corrected in relation to the difference between the load adjustment parameter $\eta_{adj}$ and a predetermined load threshold parameter $\eta_{th}$ by setting a new load parameter $\eta$ at predetermined intervals T according to the following iterative formula:

$$\eta(t+T) = \eta(t) + [\eta_{adj} - \eta_{th}]k1, \tag{8}$$

where k1 is a predetermined parameter, whose value is preferably 0.005, and the parameter $\eta_{th}$ is a predetermined threshold value of the load level, whose value is preferably 1.5. Then the sharpness of the curve in FIG. 2 is compared with a predetermined maximum value.

The measured load result $L_m$ can also be significantly lower than the load goal $L_d$, i.e. it is a matter of underload. Then a new load parameter $\eta$ is set at predetermined intervals T according to the following iterative formula:

$$\eta(t+T) = 0.95\eta(t) + 0.05 * \eta_{apriori}, \tag{9}$$

where a parameter $\eta_{apriori}$ has a predetermined value, for example, 0.5. This directs the load goal $L_d$ slowly upwards towards a load goal that is estimated to be good. As a result of the two iterative formulas, $L_d(t+T)=1-\eta(t+T)$ is thus preferably obtained as a new load goal. The solution of the invention particularly functions when the load is controlled in the transmission direction from the subscriber terminal to the base station.

A different solution can preferably be used in the transmission direction from the base station to the subscriber terminal. The strength of the received signals is preferably measured as powers. In this case the total signal power $P_r$ is formed as a mean from a time slot T of the load goal $L_d$. The timer slot T is preferably 60 ms–200 ms, for example, 100 ms. The total power $P_r$ preferably comprises the power common to traffic signals and pilot signals. The total power $P_r$ is compared with the predetermined threshold value $P_t$ and on the basis of this comparison the load result $L_d$ is either increased or reduced. In order to form the load goal $L_d=1-\epsilon$, a load parameter $\epsilon$ of the downlink is first calculated, the parameter being a real number and belonging in the range of $\epsilon \in [0, 1]$. The load parameter $\epsilon$ is preferably calculated with an iterative formula $$\epsilon(t+T) = \epsilon(t) + \frac{P_r - P_t}{P_t} * k2, \tag{10}$$

where T is a time slot and k2 is a predetermined parameter, whose value is preferably 0.01. The load parameter $\epsilon$ is preferably formed by comparing a total power $P_{tot}$ and a threshold power $P_t$ in such a manner that when the total power is higher than the threshold value the load parameter $\epsilon$ decreases and when the total power is lower than the threshold value the load parameter $\epsilon$ increases.

Figure 3:
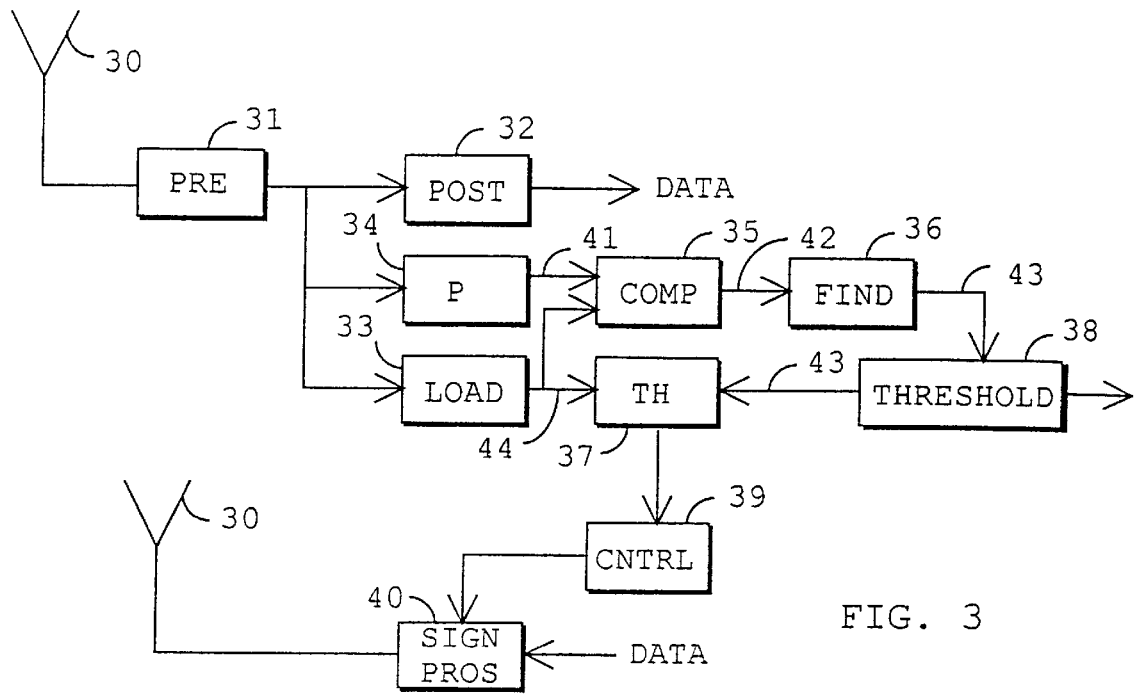
FIG. 3 is a block diagram showing the determination of a load goal in a radio system.
Figure 4:
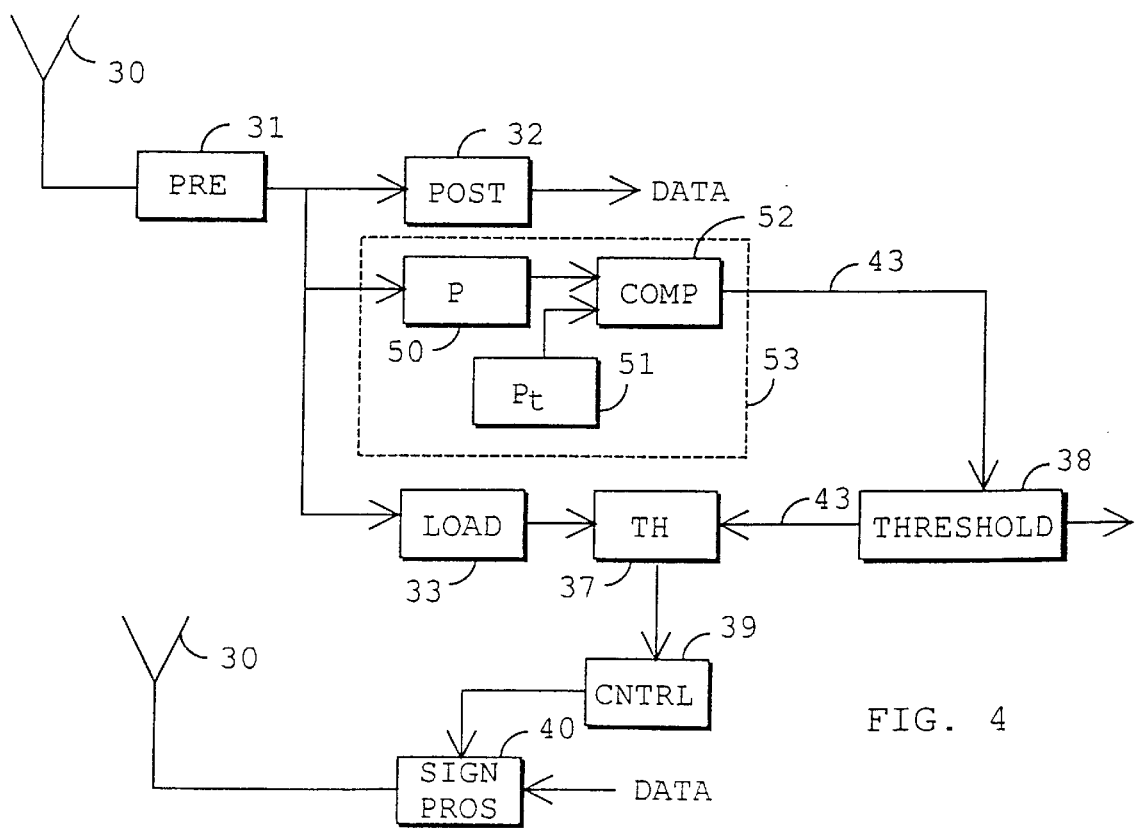
FIG. 4 is a block diagram showing the determination of a load goal in a radio system.

FIGS. 3 and 4 are block diagrams illustrating the solutions of the invention. The solutions can preferably be located at the base station of the radio system or at the base station and the base station controller. The solutions comprise an antenna 30, signal pre-processing means 31, post-processing means 32, load means 33, threshold means 37, control means 39, transmission means 40, threshold value means 38 in which the load goal is stored. A radio-frequency transmission received by the antenna 30 typically comprises signals from various transmitters functioning as sources for the desired signals and interferences. The signal combination common to the interferences and desired signals propagates from the antenna 30 to the pre-processing means 31 comprising, for example, radio frequency means and a filter (not shown in the Figure). The radio frequency means and the filter preferably reduce the frequency of the received signal combination to an intermediate frequency. The signal combination can also be handled by the pre-processing means 31 analogically and/or digitally. The post-processing means 32 comprise signal processing means which are needed, for example, at the base station of the radio system, but the function or structure of the post-processing means 32 are not relevant for the invention. The load means 33 form the load by comparing the signal strength $P_r$ of one or more desired signals and the combined total strength $P_r+I$ of both the interferences 13 and the desired signal with-one another. The load means 33 can calculate the load and the load change also by giving the signal-to-interference ratio a constant value or a mean value of a long time slot and by proportioning it using a data transmission rate and a bandwidth. The load can thus preferably be changed by changing the data transmission rate.

The solution in FIG. 3 further comprises signal strength measuring means 34, means 35 to compare the total strength changes with the load changes and means 36 to search for a desired load result. A radio system of the solution operates in accordance with the inventive method. The means 34 provide information on the total powers of the signals and the changes 41 therein. The load means 33 provide a load result 44. The means 35 to compare calculate a result resembling correlation from the variations of the load results 44 and the changes of the total powers 41. The means 36 search for the most appropriate one among these results by comparing the relations $\eta_{adj}$ 42 obtained with the predetermined maximum value $\eta_{th}$. When an appropriate load goal 43 is found, it is stored in threshold value means 38 and the aim is to keep the radio system at the desired load by changing the data transmission rates and by controlling the establishment of new connections. If the radio system detects an underload, the means 36 slowly raise the load goal towards an appropriate level.

In FIG. 4 the method of the invention comprises means 53 to increase the load goal 43 of the downlink. The means 53 further comprise means 50 to form the total strength of the signals, threshold power means 51 and comparing means 52. If the measured total strength 41 of the signals is higher than the threshold strength 51, the load goal is increased in the means 52. In the inverse case the load goal is reduced.

Figure 5:
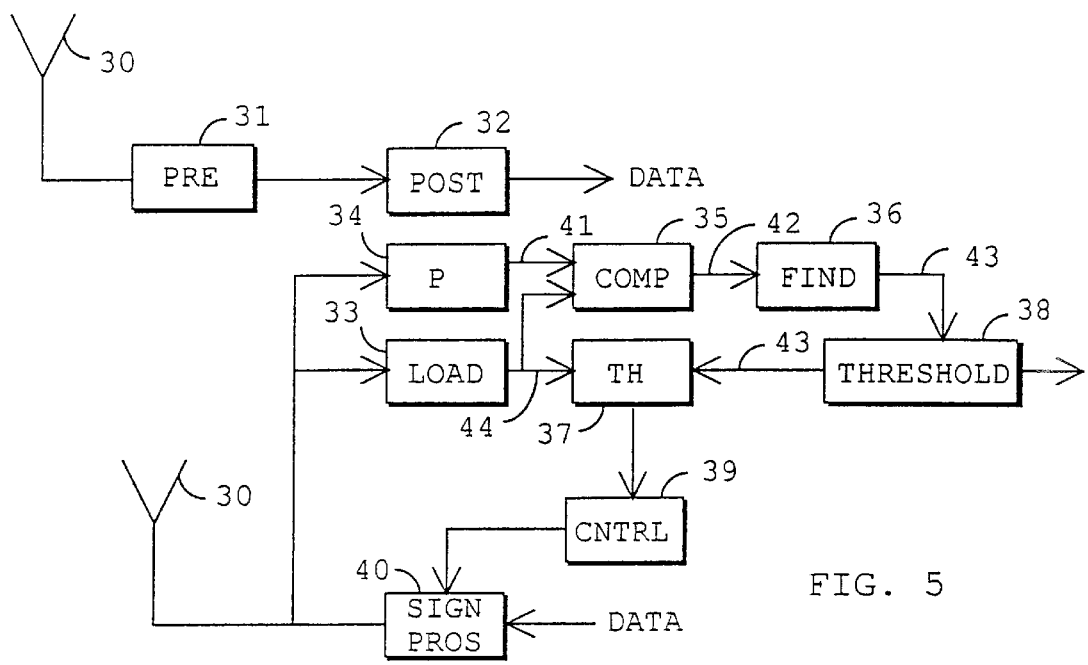
FIG. 5 is a block diagram showing the determination of a load goal in a radio system.
Figure 6:
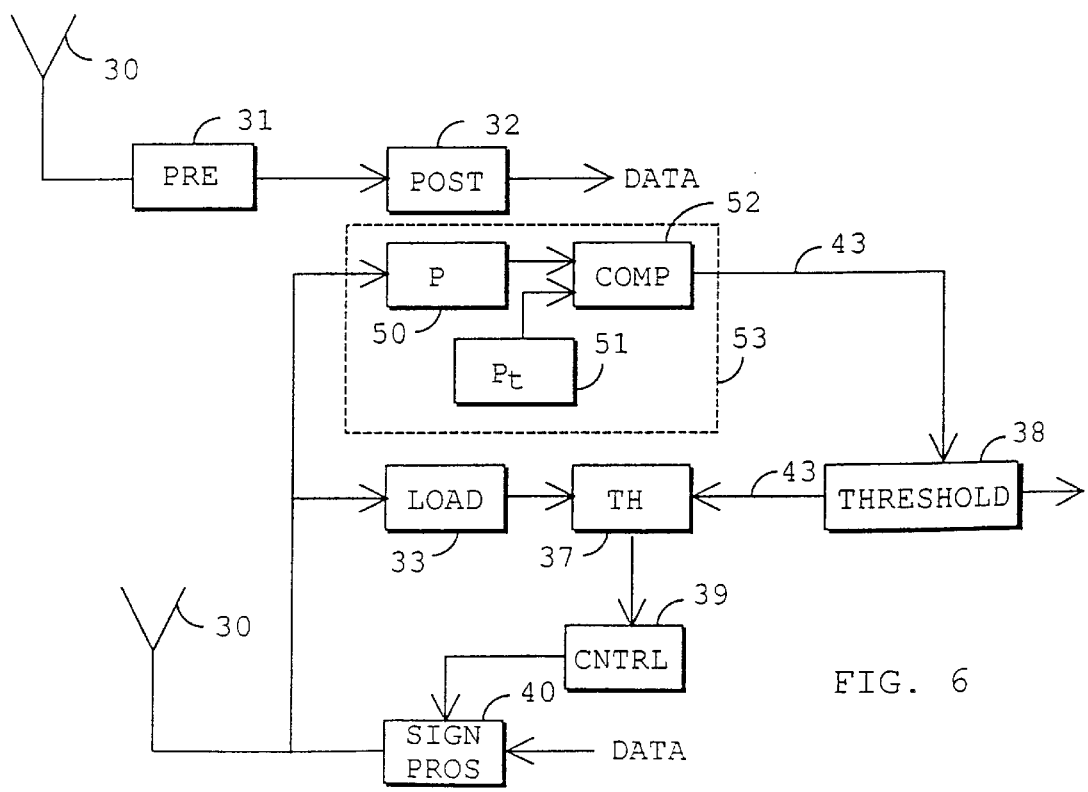
FIG. 6 is a block diagram showing the determination of a load goal in a radio system.

The solution in FIG. 5 is similar to the one in FIG. 3, but the signal strengths are measured from the transmitted signal in the same way as from the received signals. FIG. 6, in turn, shows a solution similar to the one in FIG. 4, but in this solution the signal strengths are measured from the transmitted signal. The solutions in FIGS. 5 and 6 are appropriate to the determination of the load particularly in the transmission direction from the base station to the subscriber terminal, when the load and the load change are preferably determined using a predetermined signal-to-interference ratio $SIFR_{i,t}$ formula (1). The values of parameters k1, k2, $\eta_{th}$ and $\eta_{apriori}$ are based on simulations.

The solutions can be implemented with ASIC or VLSI circuits. The functions to be performed are preferably implemented as programs based on microprocessor technology.

Even though the invention has above been described with reference to the example of the accompanying drawings, it is obvious that the invention is not restricted to it but can be modified in various ways within the scope of the inventive idea disclosed in the attached claims.

What is claimed is:

1. A method of setting a load goal in a radio system comprising at least one subscriber terminal (12) and a base station (11), and in which method a total strength of signals (41) and a load result (44) are formed, the load result being formed as an interrelationship between signal-to-interference ratio, bandwidth and data transmission rate, characterized by the steps of comparing the total signal strength (41) change with the load result (44) change;

searching for such a load result (22), the higher load results (44) of which provide a load result change lower than a predetermined threshold value in relation to the total signal (41) change, and selecting said load result (22) as a load goal (43).

2. A method as claimed in claim 1, characterized by
    increasing the load goal (43) when the total signal strength (41) is higher than a threshold strength (51) and by reducing the load goal (43) when the total strength (41) is lower than the threshold strength (51).

3. A method as claimed in claim 2, characterized by forming the load goal (43) $L_d$ as follows $L_d=1-\epsilon$, where the load parameter $\epsilon$ is formed by comparing the total power (41) and the threshold power (51) in such a manner that when the total power (41) is higher than the threshold value (51) the load parameter $\epsilon$ decreases and when the total power (41) is lower than the threshold power (51) the load parameter $\epsilon$ increases.

4. A method as claimed in claim 3, characterized by forming the load parameter $\epsilon$ and the load goal (43) at regular intervals and by measuring the total signal strength (41) as a mean of a measurement time slot.

5. A method as claimed in claim 3, characterized by calculating the load parameter $\epsilon$ substantially according to the following iterative formula $$\varepsilon(t+T) = \varepsilon(t) + \frac{P_r - P_t}{P_t} * k2,$$

where T is a measurement time slot, $P_r$ is the total signal power (41), $P_t$ is the threshold power (51) and k2 is a predetermined parameter.

6. A method as claimed in claim 1, characterized by
    forming the load result (44) repeatedly at intervals T and by
    storing the consecutive load results (44) as elements in a load result vector (44) at predetermined intervals T;
    storing the total signal strengths (41) as elements in the total strength vector (41) in a corresponding manner to the load result vector (44), whereby the comparison of the total signal strength (41) change and the load result (44) change is performed by comparing the mutual differences of the load result vector (44) and the total signal strength vector (41) elements with the differences of the load result vector (44) elements.

7. A method as claimed in claim 1, characterized by
    the relation between the total signal strength (41) change and the load result (44) change having a predetermined threshold parameter $\eta_{th}$,
    comparing the total strength (41) change with the load result (44) change a load adjustment parameter $\eta_{adj}$ is formed substantially according to the following formula:

$$\eta_{adj} = \frac{f(P_{rv}, L_{mv})}{g(L_{mv})},$$

where $P_{rv}$ is a total signal strength vector, $L_{mv}$ is a load result vector and f represents a deviation function between the total strength vector $P_{rv}$ (41) and the load result vector $L_{mv}$ (44) and g represents the deviation function within the load result vector $L_{mv}$ (44) and searching for the new load goal (43) iteratively at intervals T, whereby the load goal (43) is preferably corrected in relation to the difference between the load adjustment parameter $\eta_{adj}$ and the predetermined load threshold parameter $\eta_{th}$.

8. A method as claimed in claim 7, characterized by
    forming the load adjustment parameter $\eta_{adj}$ substantially according to the following formula:

$$\eta_{adj} = \frac{\text{cov}[\log(P_{rv}), \log(L_{mv})]}{\text{var}[\log(L_{mv})]},$$

where cov stands for covariance, var stands for variance and log stands for logarithm function.

9. A method as claimed in claim 7, characterized by
    correcting the load goal (43) in relation to the difference between the load adjustment parameter $\eta_{adj}$ and the predetermined load threshold parameter $\eta_{th}$ by setting a new load parameter $\eta$ at predetermined intervals T according to the following iterative formula:

$$\eta(t+T)=\eta(t)+[\eta_{adj}-\eta_{th}]k1,$$

where k1 is a predetermined parameter and parameter $\eta_{th}$ is a predetermined threshold value of the load level, whereby the new load goal $L_d$ (43) is substantially $L_d=1-\eta$.

10. A method as claimed in claim 7, characterized in that
    if the measured load result (44) shows a significant deviation downwards from the load goal (43) a new load parameter $\eta$ is set at predetermined intervals T according to the following iterative formula:

$$\eta(t+T)=0.95\eta(t)+0.05*\eta_{apriori},$$

where the parameter $\eta_{apriori}$ has a predetermined value, whereby
    the load goal $L_d$ (43) is substantially $L_d=1-\eta$.

11. A method as claimed in claim 1, characterized in that signals, whose total strength (41) change is compared with the load result (44) change, are received signals.

12. A method as claimed in claim 1, characterized in that the signals, whose total strength (41) change is compared with the load result (44) change, are transmitted signals.

13. A radio system comprising at least one base station (11) and a subscriber terminal (12), the radio system being arranged to form a total strength of signals (41) and a load result (44) as an interrelationship between signal-to-interference ratio, bandwidth and data transmission rate, characterized in that for uplink connections the radio system comprises means (35) to compare the total signal strength (41) change with the load result (44) change;

the radio system comprises means (36) to search for such a load result (22), the higher load results (36) of which provide a load result change lower than a predetermined threshold value in relation to the total signal (41) change and the radio system comprises threshold value means (38) which are arranged to select said load result (22) as a load goal (43).

14. A radio system as claimed in claim 13, characterized by comprising means (53) to increase the load goal (43) when the total signal strength (41) is higher than the threshold strength (51) and reduces the downlink load goal (43) when the total signal strength (41) is lower than the threshold strength (51).

15. A radio system as claimed in claim 14, characterized in that the means (53) to form the load goal are arranged to form a load parameter and the load goal at regular intervals.

16. A radio system as claimed in claim 14, characterized by the means (53) being arranged to form the load goal $L_d$ (43) according to the formula $L_d=1-\epsilon$ and the means (53) being arranged to form a load parameter E by comparing the total power (41) and the threshold power (51) in such a manner that when the total power (41) is higher than the threshold value (51) the load parameter $\epsilon$ decreases and when the total signal power (41) is lower than the threshold power (51) the load parameter $\epsilon$ increases.

17. A radio system as claimed in claim 16, characterized in that the means (53) to form the load goal are arranged to calculate the load parameter $\epsilon$ substantially according to the following iterative formula $$\varepsilon(t+T) = \varepsilon(t) + \frac{P_r - P_t}{P_t} * k2,$$

where T is a time interval, $P_r$ is the total signal power (41), $P_t$ is the threshold power (51) and k2 is a predetermined parameter.

18. A radio system as claimed in claim 13, characterized by arranging the radio system:

to form the load result $L_m$ (44) repeatedly at intervals T;

to store the consecutive load results (44) as elements in the load result vector (44) at predetermined intervals T and to store the total signal strengths (41) as elements in the total strength vector (41) in a corresponding manner to the load factor vector (44), and the means (35) to compare the total signal strength (41) change with the load result (44) change being arranged to compare the mutual differences between the load result vector (44) and total signal strength vector (41) elements with the differences of the load result vector (44) elements.

19. A radio system as claimed in claim 18, characterized in that if the measured load result (44) shows a significant deviation downwards from a load goal (43) a new load parameter η is set at predetermined intervals T according to the following iterative formula:

$$\eta(t+T)=0.95\eta(t)+0.05*\eta_{apriori},$$

where a parameter $\eta_{apriori}$ has a predetermined value, whereby the load goal $L_d$ (43) is substantially $L_d=1-\eta$.

20. A radio system as claimed in claim 13, characterized by the relation between the total signal strength (41) change and the load result (44) change having a predetermined threshold parameter $\eta_{th}$, the means (35) to compare the total signal strength (41) change with the load result (44) change being arranged to form a load adjustment parameter $\eta_{adj}$ substantially according to the following formula:

$$\eta_{adj} = \frac{f(P_{rv}, L_{mv})}{g(L_{mv})},$$

where $P_{rv}$ is a total signal strength vector, $L_{mv}$ is a load result vector and f represents a deviation function between the total strength vector $P_{rv}$ (41) and the load result vector $L_{mv}$ (44) and g represents the deviation function within the load result vector $L_{mv}$ (44) and the means (36) being arranged to search for a new load goal (43) iteratively at intervals T and to correct the load goal (43) preferably in relation to the difference between the load adjusting parameter $\eta_{adj}$ and the predetermined load threshold parameter $\eta_{th}$.

21. A radio system as claimed in claim 20, characterized by arranging the means (35) to compare the total signal strength (41) change with the load result (44) change to form the load adjusting parameter $\eta_{adj}$ substantially according to the following formula:

$$\eta_{adj} = \frac{\text{cov}[\log(P_{rv}), \log(L_{mv})]}{\text{std}[\log(L_{mv})]},$$

where cov stands for covariance, std stands for standard deviation and log stands for logarithm function.

22. A radio system as claimed in claim 20, characterized by the means (36) being arranged to correct the load goal (43) in relation to the difference between the load adjusting parameter $\eta_{adj}$ and the predetermined load threshold parameter $\eta_{th}$ by setting a new load parameter η at predetermined intervals T according to the following iterative formula:

$$\eta(t+T)=\eta(t)+[\eta_{adj}-\eta_{th}]k1,$$

where k1 is a predetermined parameter and parameter $\eta_{th}$ is a predetermined threshold value of the load level, whereby the means (36) are arranged to substantially select $L_d=1-\eta$ as the load goal.

23. A radio system as claimed in claim 13, characterized by comprising the means (35) to compare the total strength (41) change of the received signals with the load result (44) change.

24. A radio system as claimed in claim 13, characterized by comprising the means (35) to compare the total strength (41) change of the transmitted signals with the load result (44) change.

* * * * *